Figure 2:
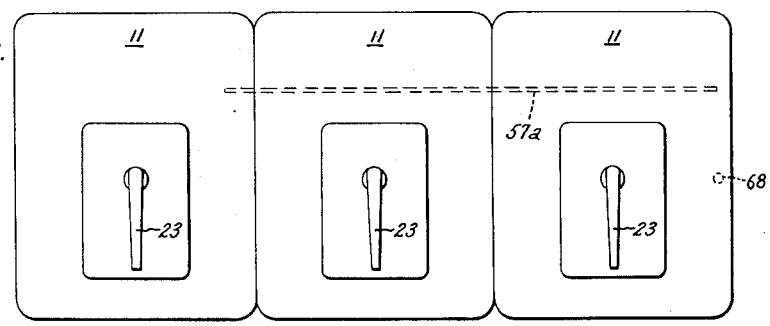

May 7, 1957  W. P. ALLEN ET AL  2,791,729
INTERLOCK MECHANISM FOR A PLURALITY OF CIRCUIT BREAKERS
Filed Jan. 15, 1954  2 Sheets-Sheet 1

Inventors:
Wendell P. Allen,
William N. Lester,
by J. Wesley Haubner
Their Attorney.

May 7, 1957 W. P. ALLEN ET AL 2,791,729
INTERLOCK MECHANISM FOR A PLURALITY OF CIRCUIT BREAKERS
Filed Jan. 15, 1954 2 Sheets-Sheet 2

Inventors:
Wendell P. Allen,
William N. Lester,
by J. Wesley Haubner
Their Attorney.

United States Patent Office 2,791,729
Patented May 7, 1957

2,791,729

INTERLOCK MECHANISM FOR A PLURALITY OF CIRCUIT BREAKERS

Wendell P. Allen, Springfield, and William N. Lester, Philadelphia, Pa., assignors to General Electric Company, a corporation of New York Application January 15, 1954, Serial No. 404,194

10 Claims. (Cl. 317—103)

Our invention relates to an interlocking mechanism for a plurality of circuit breakers and provides an improved interlock mechanism to prevent the contemporaneous closure of more than a predetermined number of a group of independently operable circuit breakers.

In an electric switchgear system it is often necessary to have more than one source of power connected to a common bus. An electric circuit breaker is usually employed to connect each source to the common bus. Due to lack of synchronism between the sources, or the fact that some sources may be alternating voltage and some may be direct voltage, or the fact that the total possible short circuit current available from all sources may exceed the interrupting capacity of the switchgear system, or due to any other requirement that may exist, it frequently is necessary to prohibit the paralleling of all sources and to allow the connection of only one or more selected sources to the bus at a time. This can be accomplished by interlocking the circuit breakers to prevent closure of more than a selected number of breakers contemporaneously. It is desirable to have an interlock means that will function regardless of whether a circuit breaker is closed manually or by electrical means.

It may be necessary under certain emergency or unusual operating conditions to permit the connection of one or more additional sources of power to the common bus. Thereafter, it is desirable in an interlock means to have a provision to disable the normal interlock and permit contemporaneous closure of selected additional breakers.

Accordingly, our invention has for an object the provision of an improved interlock mechanism to prevent contemporaneous closure of more than a selected number of breakers in a system comprising a plurality of independently operated circuit breakers.

A further object is to provide an improved mechanical interlock means for a plurality of manually or electrically closable circuit breakers to prevent the contemporaneous closure of more than a selected number of the breakers.

Another object is to provide a defeater means in an interlock mechanism adaptable to any breaker of a plurality of interlocked circuit breakers to disable the normal interlock function and permit closure of that breaker regardless of the contemporaneous closure of any other breaker.

Still another object is to provide an interlock mechanism with a defeater means that will be automatically reset whenever any breaker of contemporaneously closed breakers has tripped open.

Still another object is to provide an interlock mechanism constructed of identical operating elements for each of a plurality of circuit breakers and requiring only one interconnecting member between breakers.

An additional object is to provide an interlock mechanism suitable for a plurality of circuit breakers arranged in either a vertical or a horizontal line, or in some combination of the two, and readily adjustable for additions or removals of breakers to or from the arrangement.

Another object of our invention is to provide an interlock mechanism constructed of compact elements and readily adaptable to the ordinary structure of either stationary or drawout circuit breakers.

To carry out our invention in one form, a plurality of independently operated circuit breakers are provided with interlock linkages interconnected in a manner to prevent contemporaneous closure of more than one breaker. Closure of any specified breaker will physically operate an interlock member associated with the interlock linkage of every breaker to prevent closing operation of all other breakers. The specified breaker itself is permitted to close by operation of a neutralizer member in concert with the interlock member to neutralize the preventive effect that would be produced by movement of the interlock member alone. A defeater means can be added to the interlock mechanism of any breaker to disable the interlock and permit closure of that breaker while another breaker is closed.

Figure 1:
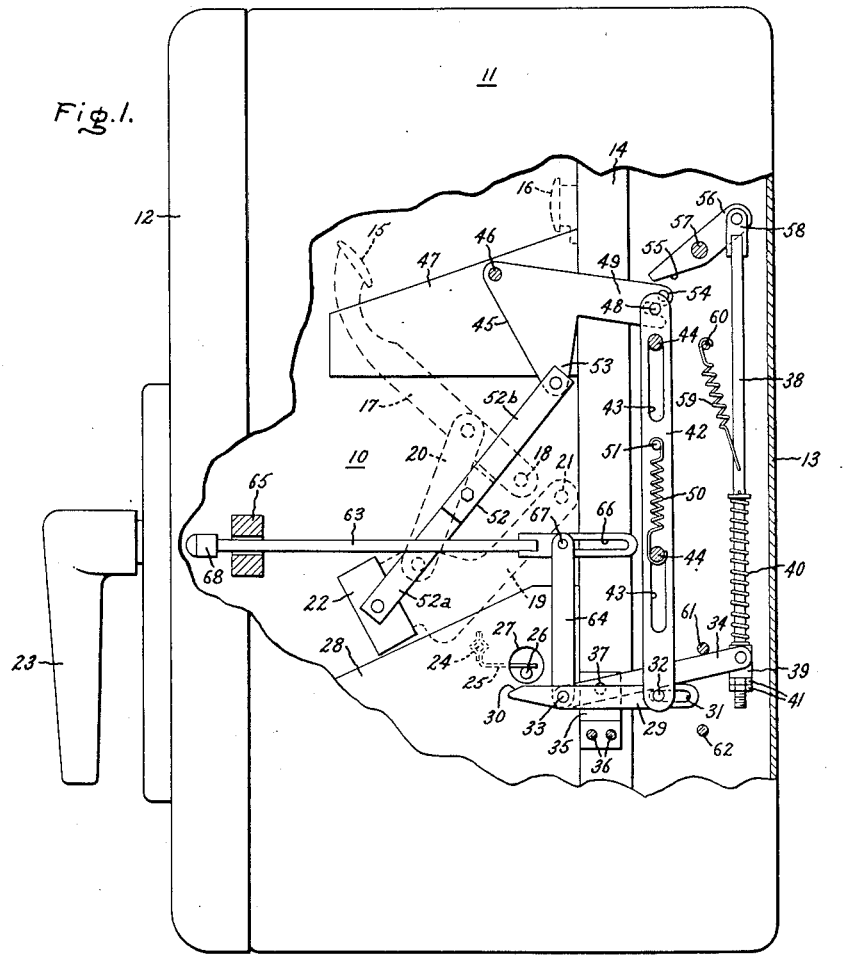
Figure 3:
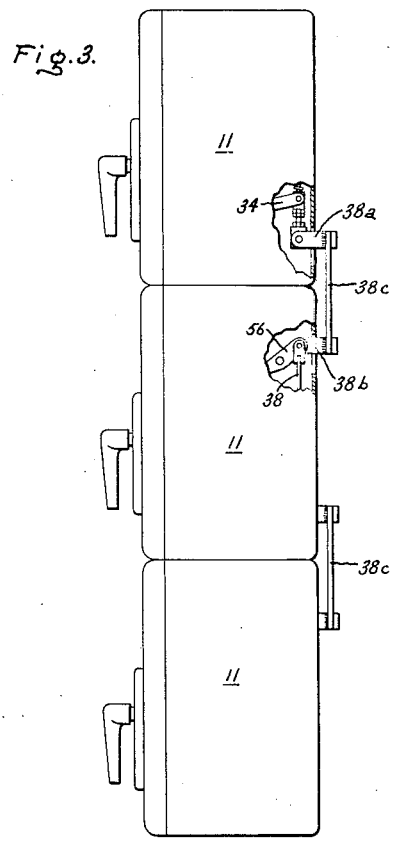
Figure 7:
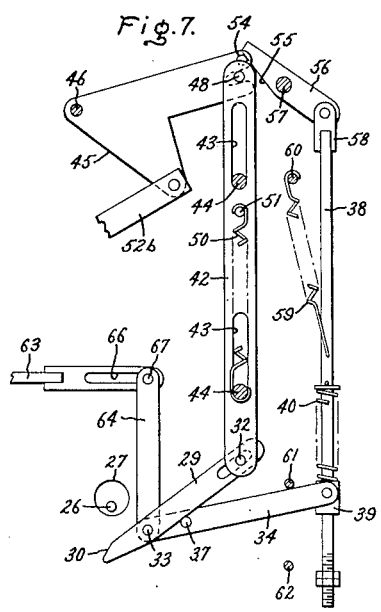

Our invention will be better understood and further objects and advantages will be apparent from the following description taken in conjunction with the accompanying drawings in which Fig. 1 is a side view of a typical electric circuit breaker housing with the near side partially removed for a better view of the enclosed circuit breaker unit and the linkage of our improved interlock mechanism; Fig. 2 is a front view of three circuit breaker housings, arranged in a horizontal line, and illustrates one means of interconnecting the interlock linkages; Fig. 3 is a side view of three circuit breaker housings arranged in a vertical line and illustrates another means of interconnecting the interlock linkages; and Figs. 4, 5, 6 and 7 are detail side views of the interlock linkages shown in their various operating positions.

As shown in side view Fig. 1, a typical circuit breaker unit, indicated generally by reference character 10, is located within an enclosing housing 11. The housing 11 is constructed of suitable side walls and top and bottom plates, and access to the circuit breaker unit 10 can be had through a vertically hinged front door, 12, shown closed. Current conductors, not shown, enter and leave housing 11 through a rear cover 13 and connect the circuit breaker unit 10 to a source of electric power and to a common bus. The various components of the circuit breaker unit 10 are supported on base 14, which in turn is mounted on a drawout carriage suitable for withdrawal from the housing 11. We have not illustrated the drawout carriage, which is of a known and standard design, in order to simplify the drawing. Our improved interlock mechanism is similarly adaptable to a stationary circuit breaker unit (10) whose base (14) could be fixedly mounted inside a housing (11). The housing 11 is shown by way of illustration only, and it will be understood by those skilled in the art that the base 14 and the various interlock parts shown mounted on the housing 11 may be mounted in any other suitable manner, enclosed or not enclosed.

The circuit breaker unit 10 may be of any suitable type, but as shown it is similar to the improved type described and claimed in Patent 2,581,181, issued on January 1, 1952 to John A. Favre. The circuit breaker includes movable and stationary interrupting switch contacts, designated as 15 and 16, respectively, and shown open in Fig. 1. The operating elements of the circuit breaker unit 10 have been greatly simplified in the illustration for the sake of clarity. It can be clearly seen that the movable switch contact 15 is carried on a contact arm 17 which is hinged at a point 18 fixedly located with respect to base 14. Contact arm 17 is connected to a movable switch member 19 by means of a link 20. Switch member 19 is pivotally joined at one end to a suitable bearing pin 21 fixedly located with respect to base 14 and carries at its other end a cross arm 22, Cross arm 22 extends horizontally along the width of the circuit breaker and is common to the movable switch member associated with each pole of an independently operable circuit breaker having more than one pole. The movable switch member 19 is actuated by circuit breaker closing means. During a breaker closing operation, switch member 19 is pivoted clockwise about pin 21 to move link 20 which in turn pivots contact arm 17 clockwise about point 18 in a velocity amplifying manner to carry movable contact 15 into circuit making engagement with stationary contact 16.

We have not shown the details of the connection between the closing means and the movable switch member 19 for the sake of drawing simplicity. The closing means employed in the illustrated embodiment of our invention includes a manually operable closing handle 23 which extends through an opening in door 12 to the front of housing 11. Manual rotation of the handle 23 will operate through bevel gears, not shown, to actuate switch member 19 and thereby to close the breaker contacts 15 and 16 as described above. It will be understood by those skilled in the art that the movable switch member 19 also could be actuated by electrical or other suitable means, such as a solenoid or an energy storing motor driven mechanism, instead of the manual means that has been shown merely by way of illustration.

A latch means is provided for circuit breaker unit 10 and includes a trip latch shaft 24 connected by link 25 to trip pin 26. As viewed in the drawings, raising trip pin 26 will tilt the trip latch shaft 24 counterclockwise to trip the circuit breaker. The actual latching mechanism has not been shown. This mechanism, which may be of any suitable construction, such as, for example, that described and claimed in the aforesaid Favre Patent No. 2,581,181, will not only cause movable contact 15 to open when shaft 24 is tilted counterclockwise, but also will cause trip-free operation of the breaker 10 by preventing closing movement of switch member 19 upon attempted operation of the closing means 23. Trip pin 26 extends through a hole 27 in a side wall 28 of circuit breaker unit 10 and normally rests in its lower, non-tripped position as shown in Fig. 1.

The trip pin 26 can be lifted to its raised, tripped position, by a movable trip lever 29 of the interlock linkage. One end of the trip lever 29 has a camming surface 30 for releasably engaging and lifting the trip pin 26, while at the other end is a slot 31 that engages a pin 32 to form a pivot. Intermediate its ends, trip lever 29 contains a pin structure 33 which provides a pivotal connection to one end of a movable interlock link 34, and the trip lever 29 will rotate about pivot 32 in response to movement of the interlock link 34.

A bracket 35 is fixedly connected to the near side wall (partially removed) of housing 11 by a pair of screws 36 and pivotally supports interlock link 34 intermediate its ends at 37. Pivotal movement of link 34 is controlled by a movable interlock member 38, which, as shown in the drawings, is a vertically disposed rod located in the rear of housing 11. The interlock member 38 is substantially perpendicular to the interlock link 34 and is pivotally coupled thereto by means of a slidable tube 39. The tube 39 will slide along the length of rod 38, but is resiliently held by a compression spring 40 against a pair of adjustable stop nuts 41 threaded onto the lower end of rod 38. Thus, as viewed in Fig. 1, downward movement of interlock member 38 will carry tube 39 downward to pivot interlock link 34 clockwise which will raise pin structure 33 and thereby cause trip lever 29 to rotate clockwise about pin 32. This action will result in the operable engagement of trip pin 26 by the camming surface 30 of trip lever 29 to lift pin 26 to its tripped and trip-free position. The resulting position of the trip lever 29 can be seen in Fig. 4.

The operable engagement of camming surface 30 with trip pin 26 as effected by downward movement of interlock member 38 can be prevented and the action outlined above can be neutralized by shifting the position of pivot 32. More particularly, if pivot 32 is raised at the same time trip lever 29 is being rotated clockwise about pivot 32 by movement of pin structure 33, trip lever 29 concurrently will be rotated counterclockwise about pin structure 33 with the result that camming surface 30 will experience ineffective movement and will not engage trip pin 26. The position of the trip lever 29 resulting from the concerted movements of pin structure 33 and pivot 32 can be seen in Fig. 5.

To effect shifting of pivot 32, the pin 32, which is engaged by slot 31 of trip lever 29 to form the pivot 32, is rigidly connected to a movable neutralizer member 42. The neutralizer member 42, as can be seen in Fig. 1, is in the form of a bar disposed substantially parallel to the interlock member 38 for vertical motion, and a pair of guide slots 43 are located therein suitable for slidable engagement by a pair of support pins 44 fixedly mounted on the near side wall (partially removed) of housing 11. The lower end of the neutralizer bar 42 carries pin 32, while the upper end is pivotally joined to a slotted arm 49 of a bell crank 45 which in turn is pivotally mounted at its vertex 46 on a bracket 47 fixed to the circuit breaker base 14. The line subtended by the end of the slotted arm 49 during pivotal motion of bell crank 45 runs substantially vertically and, therefore, vertical, linear motion is imparted to the neutralizer bar 42. As shown, the connection between the neutralizer 42 and the slotted arm 49 of crank 45 is formed by the releasable engagement of a pin 48 extending transversely from the neutralizer bar 42 with the open-ended slot in arm 49. While any other similar connection could be employed, this one is particularly well suited for a drawout circuit breaker wherein the circuit breaker unit 10, including bell crank 45, must be withdrawn and disconnected from the stationary enclosing housing 11 and its attached neutralizer bar 42. A bias spring 50 is provided between the lower pin of fixed support pins 44 and a stud 51 connected to the movable neutralizer bar 42 for biasing the neutralizer bar 42 to its lowest position whenever pin 48 is disengaged from the open-ended slot of arm 49. This condition occurs whenever the drawout circuit breaker unit 10 is withdrawn from its enclosure 11, and the neutralizer bar 42 is thereby biased to line up with and engage the crank 45 upon reinsertion of the circuit breaker unit 10.

The pivotal movement of bell crank 45 is controlled by movement of switch member 19. A rigid connector 52 is connected at one end to the cross arm 22 of switch member 19 and at the other end to an unslotted arm 53 of bell crank 45 so that crank 45 will be moved jointly with and in response to movement of the switch member 19. The connector 52 is comprised of two overlapping sections, 52a and 52b. The purpose of the two sections is to provide a means for initial adjustment of the length of connector 52 thereby to position the slotted arm 49 of crank 45 for engagement with pin 48 of the neutralizer bar 42 upon insertion of the circuit breaker unit into its enclosing housing 11. Once such an initial adjustment has been made, the two sections 52a and 52b can be welded to form a one piece rigid connector 52.

With the trip pin 26 in its lower, non-tripped position, the circuit interrupter contacts 15 and 16 can be closed by operation of the manual closing handle 23. The movement of switch member 19 during the breaker closing operation will cause crank 45 to pivot counterclockwise about its vertex 46, and such pivotal motion by crank 45 will raise the neutralizer bar 42 and thereby shift pivot 32 to the position indicated in Fig. 5 wherein trip lever 29 assumes the position of non-engagement with trip pin 26. The linear movement of neutralizer 42 and the pivotal movement of crank 45 both take place within definite limits defined by the positions of switch member 19. Thus, with the switch member 19 in its breaker open position, the crank 45 and neutralizer bar 42 are definitely fixed in the positions shown in Figs. 1, 4 or 6; while after closure of the breaker, with switch member 19 in its breaker closed position, the crank 45 has pivoted counterclockwise and the neutralizer, bar 42 has raised to the positions shown in Figs. 5 or 7.

Pivotal motion of bell crank 45 during circuit breaker closure also actuates movement of interlock member 38. A pin 54 protrudes transversely from the slotted arm 49 of crank 45 for releasable engagement with a camming surface 55 of a reciprocating link 56. The link 56 is rigidly connected intermediate its ends to a shaft 57 which in turn is pivotally supported in a suitable bearing bracket (not shown) which is fixed to the near side wall (partially removed) of housing 11. One end 58 of link 56 is pivotally joined to the upper end of the interlock member 38, while the other end includes the camming surface 55. The link 56 is an actuating means for the interlock member 38 and is disposed in a generally perpendicular relationship thereto so that pivotal movement of link 56 on shaft 57 effects vertical displacement of the interlock member 38. As can be seen in Fig. 1, the counterclockwise motion of crank 45 during breaker closure will cause link 56 to pivot clockwise on its shaft 57 and will result in the downward displacement of interlock member 38.

The interlock member 38 is biased to its highest position by the action of biasing spring 59 connected between the interlock member 38 and a stud 60 fixedly mounted on the near side wall (partially removed) of housing 11. The highest position of interlock member 38, which is assumed whenever the circuit breaker is open, is limited by the interlock link 34, coupled to the lower end of interlock member 38, resting against a stop pin 61 fixedly located on the near side wall (partially removed) of housing 11, as shown in Fig. 1. A second pin, 62, is also fixedly mounted on the near side wall (partially removed) of housing 11 and defines the lower limit of interlock link 34 upon downward movement of the interlock member 38.

In an arrangement of a plurality of independently operable circuit breakers, all of the elements or linkages of the interlock mechanism described above are associated with each circuit breaker unit. Each element operates in conjunction with its associated breaker. In the illustrated embodiment of our invention, the only interconnection between the individual interlock linkages of each circuit breaker is that positively connecting the movable interlock member 38 of each linkage to the corresponding member 38 associated with an adjacent breaker. Therefore, all interlock members (38) and the elements controlled thereby operate simultaneously or jointly. For breakers located in a horizontal line, an extended shaft 57a is employed to interconnect the interlock members (38). Thus, as illustrated in Fig. 2 for 3 breakers side by side, a single, rigid shaft 57a is common to the interlock linkages of the three breakers. The reciprocating link 56 in each unit is rigidly connected to the shaft 57a, so that pivotal movement of a link 56 associated with any one breaker will effect simultaneous joint pivotal movement of the corresponding links (56) associated with each of the remaining two breakers, thereby effecting joint vertical movement of all three interlock members (38). For breakers located in a vertical line, the interconnection is made by addition to and extension of the interlock member 38 itself. Thus, as shown in Fig. 3 for three breakers one above the other, the lower end of the interlock member 38 of an upper breaker is rigidly connected to the upper end of the interlock member 38 of the breaker immediately below. A rigid member 38a is added to the lower end of the interlock member 38 associated with an upper breaker and extends through an opening in the rear cover 13 of the housing 11. A similar rigid member 38b is added to the upper end of the interlock member 38 associated with the breaker below, and the two are rigidly connected together by a member 38c disposed vertically behind the breaker housings (11). Vertical movement of an interlock member 38 associated with any one breaker will effect joint vertical movement of the corresponding member 38 associated with each of the remaining two breakers.

The interlock linkages associated with each breaker are constructed and assembled so that the extended shaft 57a or the interconnecting members 38a, b, and c, can readily be added, and therefore it is possible with no modification of the interlock elements other than the addition of these parts to add breakers to any given arrangement of circuit breakers in either a horizontal or vertical relationship thereto or in some combination of the two. Similarly, one or more breakers radily can be removed from a circuit breaker arrangement without necessitating any change in the interlock elements of the remaining breakers.

A defeater mechanism can be added to the interlock linkage of any breaker. This mechanism comprises a manually operable slidable rod 63 and a floating lever 64. As viewed in Fig. 1, the defeater rod 63 is disposed substantially horizontally along the near side of the housing 11 and extends toward the front of housing 11 for operation therefrom. The defeater rod 63 is slidably supported by a suitable guide 65 fixed to the near side wall (partially removed) of housing 11. The end of the defeater rod 63 toward the rear of housing 11 has a slot 66 for engaging a pin 67 fixed to one end of the floating lever 64. The other end of the floating lever 64 is fixedly connetced to the interlock link 34. The lever 64 and the link 34 are disposed substantially perpendicular to each other, and the fixed connection therebetween is made at the end of the link 34 that is connected to pin structure 33. These two members, therefore, combine to form one rigid, generally L-shaped member that is pivotal about point 37. During normal operation of the interlock mechanism, defeater rod 63 will assume the position shown in Fig. 1, while pin 67 of floating lever 64 will slide in slot 66 in response to movement of the interlock link 34. Thus, with the circuit breaker open and interlock member 38 in its raised position, interlock link 34 and floating lever 64 will take the position shown in Figure 1. When the interlock member 38 has been moved downward, interlock link 34 will pivot clockwise about 37 in combination with floating lever 64, and the combination will take a position illustrated in Fig. 4.

Figure 6:
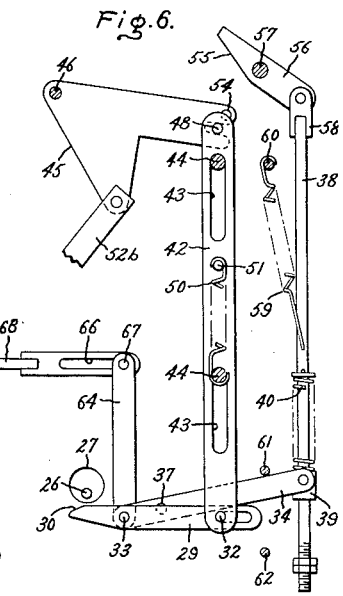

To operate the defeater rod 63, the door 12 of housing 11 must be opened, in the illustrated embodiment of our invention, for access to a knurled knob 68 located on the front end of rod 63. When the knob 68 is pulled manually, the defeater rod 63 will slide forward. If this operation is performed while the interlock elements are in their relative positions shown in Fig. 4, in which the circuit breaker is open, the position of floating lever 64 will be changed. Pin 67 is engaged by the rear end of slot 66 and is pulled forward with the defeater rod 63. This action will pivot floating lever 64 and interlock link 34 counterclockwise about 37 to raise the tube 39 from its normal position at the lower end of interlock member 38 against the force of spring 40. This pivotal movement of link 34 will depress pin structure 33 and thus will cause trip lever 29 to pivot counterclockwise about pivot 32 thereby disengaging camming surface 30 from trip pin 26. The relative positions of the interlock elements will now be as shown in Fig. 6. With the defeater rod 63 held in its forward position, its associated circuit breaker may be closed. Upon release of knob 68, defeater rod 63 will return to its normal position under the urging of compressed spring 40.

Unauthorized operation of the defeater rod 63 can be prevented by providing a lock on door 12, which must be opened for access to knob 68, or by providing a suitable lock on the defeater rod 63 itself, or by some other similar means. We have not illustrated such a provision in our drawings.

From the foregoing detailed description of the structure of our improved interlock mechanism, its mode of operation may now be readily followed. In an arrangement of a plurality of interlocked independently operated circuit breaker units, with all breakers open as shown in Fig. 1, any one specified breaker can be closed by operation of its manual closing handle 23. In response to movement of switch member 19 during the closing operation of the specified breaker, its associated bell crank 45 pivots counterclockwise about vertex 46. Movement of the slotted arm 49 of the pivoting crank 45 carries the neutralizer bar 42 upward and concurrently pivots reciprocating link 56 clockwise on shaft 57. The clockwise pivotal motion of link 56 results in a downward displacement of interlock member 38. Thus the neutralizer bar 42 and interlock member 38 associated with the specified breaker move in concert during closing operation of that breaker. The downward displacement of interlock member 38, acting through link 34, pivots the trip lever 29 clockwise about pivot 32 and the camming surface 30 of lever 29 tends to move into operable engagement with trip pin 26. However, at the same time pivot 32 is shifted by the upward movement of neutralizer bar 42 so that trip lever 29 rotates counterclockwise with respect to pin structure 33 and the camming surface 30 tends to move away from trip pin 26. The resultant movement of trip lever 29 is generally neutralized and at no time during the closing operation of the specified circuit breaker does the camming surface 30 of trip lever 29 operably engage trip pin 26. The relative position of the interlock elements of the one breaker that has been closed can be seen in Fig. 5.

Figure 4:
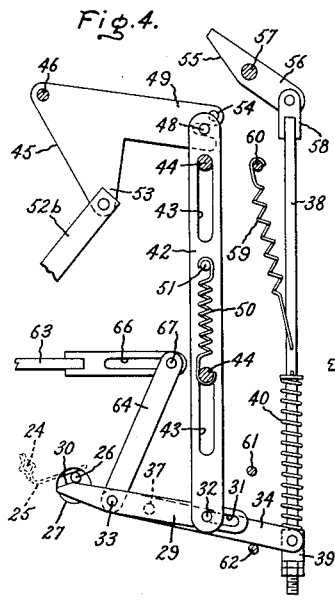
Figure 5:
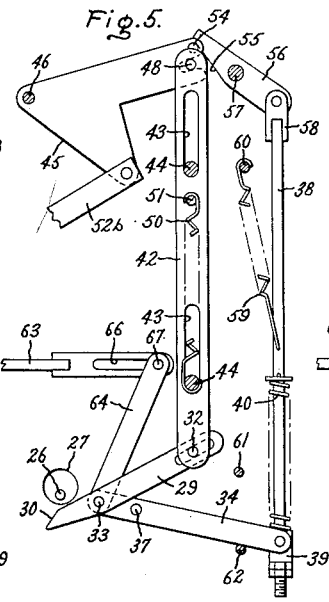

Simultaneous with the movement of the interlock member 38 associated with the specified breaker being closed, the corresponding member 38 associated with each of the remaining breakers experiences the same displacement due to the positive interconnection therebetween. However, the neutralizer bar 42 associated with each of the remaining breakers experiences no movement. The remaining breakers are open and their associated bell cranks (45) are unmoved and therefore each neutralizer bar 42 remains in its lowest position. Consequently, the trip lever 29 of each remaining breaker is pivoted clockwise about pivot 32 and camming surface 30 operably engages and lifts the associated trip pin 26 as shown in Fig. 4. With the trip pin 26 in its raised, tripped and trip-fee position, the breaker latch means will prevent closure of that breaker. An attempted closure by any closing means will not actuate the switch member 19 and will not close the breaker. Thus, the interlock mechanism prevents the contemporaneous closure of more than one breaker in the circuit breaker arrangement.

At any time the one specified breaker is tripped open, all interlock elements will return to their original positions illustrated in Fig. 1. Upon opening movement of the switch member 19 the bell crank 45 will pivot clockwise and the associated neutralizer bar 42 will be lowered. The interlock members (38) of all breakers will follow the clockwise pivoting of the one crank 45 and will move upward under the urging of their bias springs (59). With all the circuit breakers open, any specified one can be subsequently closed, after which the interlock mechanism will prevent contemporaneous closure of all others.

While in the illustrated embodiment of our invention we have shown a circuit breaker arrangement in which only one breaker can be closed at a time, it will be clear to those skilled in the art that our interlock mechanism can be modified to permit contemporaneous closure of more than one selected breaker. Such a modification, for example, may be made by changes in the connections between certain elements of the interlock mechanism including the addition of a positive interconnection between the neutralizer bars (42) of a selected group of breakers for simultaneous joint operation thereof upon closure of any one breaker in the group. Thus the pivot 32 associated with each breaker in the group would be shifted and all breakers in the group could be closed at will, but the contemporaneous closure of any remaining breaker would be nevertheless prevented. However, we have illustrated an embodiment in which only one circuit breaker can be closed at a time.

For the unusual operating condition requiring the contemporaneous closure of one or more additional breakers, a defeater means can be added to the interlock linkage of any circuit breaker to disable the normal interlock function for that particular breaker. With another breaker closed, the interlock elements of the breaker subject to defeat are in the relative positions shown in Fig. 4. Operation of the defeater mechanism will cause defeater rod 63 to slide forward and pin structure 33 to be depressed by the pivotal movement of floating lever 64 and interlock link 34 about 37 and thereby trip lever 29 will be pivoted counterclockwise about pivot 33 in opposition to its pivotal displacement produced by the interlock member 38. Camming surface 30 of trip lever 29 is thereby disengaged from trip pin 26. The counterclockwise pivoting of interlock link 34 by the defeater means operably uncouples the connecting tube 39 from its normal position on interlock member 38, the uncoupling being permitted by the compression of spring 40. See Fig. 6 for the resulting relative positions of the interlock elements. Trip pin 26 now has returned to its lower non-tripped position and the interlock linkage has been disabled. Upon closing the defeated breaker, neutralizer bar 42 raises and pivot 32 is shifted thereby to position 32'. The resulting relative positions of the interlock elements can be seen in Fig. 7. Upon subsequent release of defeater rod 63, floating lever 64 in combination with interlock link 34 will be free to pivot clockwise about 37 under the urging of spring 40. Pin structure 33 will be raised thereby and trip lever 29 will pivot clockwise about pivot 32, but camming surface 30 of lever 29 is prevented from operably engaging trip pin 26 due to the previous shift of pivot 32 to position 32'. The breaker will remain closed and the interlock elements will now be in the relative positions illustrated in Fig. 5. Thus more than one breaker can be contemporaneously closed.

The interlock mechanism is automatically reset upon subsequent opening of a breaker that has been closed contemporaneously with another breaker. The other breaker remaining closed, the defeater mechanism for the opened breaker must again be operated before reclosure can be effected.

A defeater means can be added to the interlock linkage of any number of circuit breakers. Each breaker with a defeater means can be closed regardless of the contemporaneous closure of any other breaker or breakers. However, the interlock linkage of each breaker in the circuit breaker system is unaffected by operation of the defeater means of any other breaker. In a system comprising a plurality of circuit breakers employing our improved interlock mechanism it is possible to close any one breaker and subsequently to close independently all breakers furnished with defeater means while contemporaneous closure of all other breakers will be prevented.

While we have shown and described a preferred form of our invention by way of illustration, many modifications will occur to those skilled in the art. Therefore, we contemplate by the appended claims to cover all such modifications as fall within the true spirit and scope of our invention.

What we claim as new and desire to secure by Letters Patent of the United States is:

1. In an interlock mechanism for a circuit breaker having a movable switch member and a latch element movable to a tripped position to prevent closing movement of said switch member, an interlock member mounted for actuation in response to closing movement of said switch member, a trip member normally coupled for movement with said interlock member in a manner to move said latch element to its tripped position in response to closing movement of said switch member, and a defeater mechanism operable independently of both said switch member and said interlock member to render said trip member ineffective to move said latch element to said tripped position.

2. In an interlock mechanism for a plurality of independently operable circuit breakers each having a movable switch member, a plurality of interconnected interlock linkages, each of said interlock linkages being associated with one of said breakers and including, neutralizing means responsive to closing movement of the associated switch member to permit closure of selected breakers, interlock means disposed to prevent contemporaneous closure of all breakers other than said selected breakers, and defeater means separately operable to disable the interlock means and permit closure of the associated breaker contemporaneously with said selected breakers.

3. In an interlock mechanism for a plurality of independently operable circuit breakers each of which includes a movable switch member and a latch element movable to a tripped position to prevent closing movement of said switch member, an interlock linkage associated with each of said circuit breakers, each of said linkages comprising an interlock member mounted for actuation in response to closing movement of said switch member, a trip member normally coupled for movement with said interlock member in a manner to move said latch element to its tripped position in response to closing movement of said switch member, means coupling together the interlock members of each of said linkages for joint operative movement, and neutralizing means associated with each circuit breaker, the neutralizing means for a specified breaker being actuable by closing movement of the switch member of said specified breaker to render the trip member for said specified breaker ineffective to move the latch element of said specified breaker to said tripped position.

4. In an interlock mechanism for a plurality of independently operable circuit breakers each of which includes a movable switch member and a latch element movable to a tripped position to prevent closing movement of said switch member, an interlock linkage associated with each of said circuit breakers, each of said linkages comprising an interlock member mounted for actuation in response to closing movement of said switch member, a trip member normally coupled for movement with said intrelock member in a manner to move said latch element to its tripped position in response to closing movement of said switch member, means coupling together the interlock members of each of said linkages for joint operative movement, neutralizing means associated with each circuit breaker, the neutralizing means for a specified breaker being actuable by closing movement of the switch member of said specified breaker to render the trip member for said specified breaker ineffective to move the latch element of said specified breaker to said tripped position, and a defeater means separately operable to render said trip member substantially immobile thereby to permit closure of its associated circuit breaker.

5. In an interlock mechanism for a plurality of independently operable circuit breakers each of which includes a movable switch member and a latch element movable to a tripped position to prevent closing movement of said switch member, an interlock linkage associated with each of said circuit breakers, each of said linkages comprising a movable interlock member displaceable in response to closing movement of said switch member, a trip lever operable to move said latch elements to its tripped position, resilient coupling means interconnecting said interlock member and said trip lever whereby said lever is normally operable in response to closing movement of said switch member to move said latch element to said tripped position, positive coupling means interconnecting the interlock members of each of said linkages for joint operative movement, and a separately operable neutralizing means, the neutralizing means associated with a specified breaker being actuable by closing movement of the switch member associated with said specified breaker to render the trip lever associated with said specified breaker ineffective to move the associated latch element to said tripped position; and a separately operable defeater mechanism associated with at least one of said circuit breakers for disabling its associated resilient coupling means thereby operatively uncoupling its associated trip lever from its associated interlock member whereby closure of the associated breaker is permitted.

6. In an interlock mechanism for a plurality of independently operable circuit breakers each of which includes a movable switch member and a latch element movable to a tripped position to prevent closing movement of said switch member, an interlock linkage associated with each of said circuit breakers, each of said interlock linkages including an interlock member releasably engageable with the switch member of the associated breaker for displacement thereby, means positively interconnecting the corresponding interlock members of all of said circuit breakers for joint operative movement, a movable neutralizer member separately actuable by said switch member of said associated breaker, and a trip lever connected to said interlock and neutralizer members and operable to move the associated latch element to its tripped position in response to displacement of said interlock member during closing movement of said switch member, the neutralizer member of a specified breaker movable in response to the closing movement of the switch member of said specified breaker to neutralize the effect of the displacement of the interlock member of said specified breaker and to render the trip lever of said specified breaker substantially immobile thereby permitting closure of said specified breaker; and a separately operable defeater member associated with at least one of said circuit breakers and disposed to render said trip lever inoperable thereby to permit closure of the defeated breaker regardless of said displacement of the associated interlock member.

7. In an interlock mechanism for a plurality of independently operable circuit breakers each having a movable switch member and a latch element movable to a tripped position to prevent closing movement of said switch member, a mechanical interlock linkage associated with each of said circuit breakers and including a movable interlock member releasably engageable with the switch member of the associated breaker and displaceable in response to closing movement thereof, a trip lever resiliently coupled to said interlock member and movable about a pivot in response to displacement of said interlock member in a manner to move the associated latch element to its tripped position, a separate movable neutralizer member connected to said trip lever and actuated in response to closing movement of the associated switch member in a manner to shift said pivot in a direction to render said strip lever inoperable to move the associated latch element to said tripped position, and means positively interconnecting the corresponding interlock members of the interlock linkage of all of said breakers for joint displacement thereof during closure of one of said breakers, whereby the concerted movements of said neutralizer member and of said interlock member during closure of a specified circuit breaker neutralize the effective movement of the trip lever of said specified breaker and permit closure of said specified breaker while the joint displacement of all interlock members produces pivotal motion of the trip levers associated with all circuit breakers other than said specified breaker to move their respective associated latch elements to said tripped position to prevent contemporaneous closure of all said breakers other than said specified breaker; and a separately operable defeater member coupled to the trip lever of said interlock linkage for disabling the associated resilient coupling thereby operatively uncoupling the associated trip lever from its associated interlock member to permit closure of the associated breaker contemporaneously with said specified breaker.

8. In an interlock mechanism for a pair of circuit breakers each of which includes a movable switch member and a latch actuating element movable to a tripped position to prevent circuit closing operation by said switch member, a pair of interlock members each mounted adjacent one of said circuit breakers for acuation in response to circuit closing operation by the movable switch member of the associated circuit breaker, means rigidly interconnecting both of said interlock members for joint movement thereof, a pair of pivotally mounted trip levers, means coupling each of said trip levers with one of said interlock members to move said trip lever to latch tripped position in response to actuation of either of said interlock members, and neutralizing means coupling each of said trip levers to the movable switch member of the associated circuit breaker for shifting the pivotal mounting of the trip lever in concert with actuation of the associated interlock member during circuit closing operation by the movable switch member to render the trip lever inoperable to move to its latch tripped position, whereby the first of said pair of circuit breakers selected to be closed is permitted to close by the action of its associated neutralizing means while closure of the remaining circuit breaker is prevented due to the joint movement of said interlock members.

9. In an interlock mechanism to prevent contemporaneous closure of more than one of a plurality of circuit breakers each of which includes a movable switch member and a latch element movable to a tripped position to prevent circuit closing operation by said switch member, a plurality of interlock members each mounted adjacent one of said circuit breakers and biased into engaging relationship with the movable switch member of the associated circuit breaker, each said interlock member disposed for a predetermined movement against its bias in response to circuit closing operation by the movable switch member, means rigidly interconnecting all of said interlock members for joint movement thereof, a plurality of trip members each coupled to one of said interlock members and each disposed in engaging relationship with the latch element of the associated circuit breaker, each said trip member being operable to move the latch element to its tripped position in response to said predetermined movement by the associated interlock member, and separate neutralizing means coupling each of said trip members to the associated movable switch member to render the trip member of the first of said plurality of circuit breakers selected to be closed inoperable during circuit closing operation by the associated movable switch member, whereby contemporaneous closure of all the remaining circuit breakers is prevented due to the joint predetermined movement by said interlock members.

10. In an interlock mechanism to prevent contemporaneous closure of more than a preselected group of a plurality of circuit breakers each having a movable switch member and a latch element movable to a tripped position to prevent circuit closing operation by said switch member, a plurality of interlock members each mounted adjacent one of said circuit breakers for predetermined movement in response to circuit closing operation by the associated movable switch member, means rigidly interconnecting all of said interlock members for joint movement thereof, a plurality of trip members each coupled to one of said interlock members and each disposed in engaging relationship with the latch element of the associated circuit breaker, each said trip member being operable to move said latch element to its tripped position in response to said predetermined movement by the associated interlock member, and neutralizing means for each of said circuit breakers, each of said neutralizing means being disposed to render selected trip members inoperable in response to circuit closing operation by the movable switch member of the associated circuit breaker, whereby a preselected group of said circuit breakers may be closed contemporaneously and subsequent closure of all other said circuit breakers is prevented.

References Cited in the file of this patent

UNITED STATES PATENTS

| | | |
|---|---|---|
| 1,337,895 | French | Apr. 20, 1920 |
| 1,382,936 | Schilling | June 28, 1921 |
| 2,531,157 | Pifke | Nov. 21, 1950 |